W. STOFFEL.
RAKE ATTACHMENT.
APPLICATION FILED APR. 9, 1915.
1,208,855.
Patented Dec. 19, 1916.
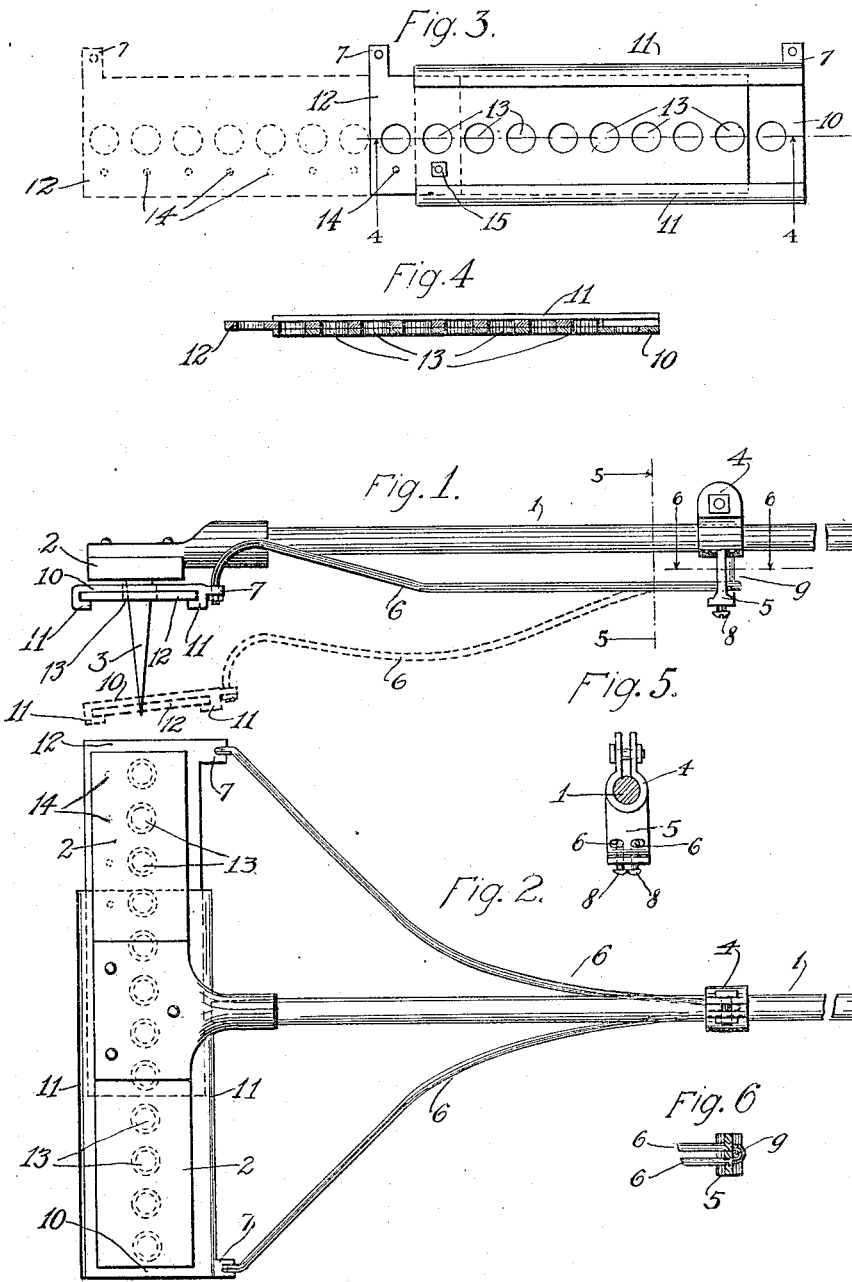

UNITED STATES PATENT OFFICE.

WILLIAM STOFFEL, OF McHENRY, ILLINOIS.

RAKE ATTACHMENT.

1,208,855.	Specification of Letters Patent.	Patented Dec. 19, 1916.

Application filed April 9, 1915.   Serial No. 20,256.

*To all whom it may concern:*

Be it known that I, WILLIAM STOFFEL, a citizen of the United States, residing at McHenry, in the county of McHenry and State of Illinois, have invented certain new and useful Improvements in Rake Attachments, of which the following is a specification.

This invention relates to improvements in rake attachments and more particularly to improved means for application to an ordinary rake whereby the rake teeth may be readily freed of grass, leaves and other matter that may adhere thereto while the rake is in use.

With the foregoing and other objects in view the invention consists in the combination and arrangement of parts to be hereinafter fully described in the following specification, pointed out in the claim and illustrated in the accompanying drawings which form a part of said specification and in which—

Figure 1 is a side elevation of a rake provided with my attachment. Fig. 2 is a plan view of the same. Fig. 3 is a plan view of the attachment removed. Fig. 4 is a sectional view taken on line 4—4 of Fig. 3. Fig. 5 is a section taken on line 5—5 of Fig. 1. Fig. 6 is a section taken on line 6—6 of Fig. 1.

Like reference characters indicate corresponding parts throughout the several views.

The reference numeral 1 designates the rake handle, 2 the head and 3 the teeth.

Referring to the drawing I mount a clamp 4 slidably upon the handle 1 and said clamp is provided with a depending shank 5 formed with apertures through which a spring rod 6 passes, said rod being approximately Y-shaped and its end being connected to the integral ears 7, 7 of the cleaning member to be hereinafter fully described.

The apertures in the shank 5 through which the spring rod passes are of greater diameter, in one direction, than the said rod to permit adjustment of said rod, the rod being rigidly secured in adjusted position by means of the set screws 8, 8 which extend into the shank 5 from its lower or free end a distance sufficient to permit engagement with the said rod; said screws serving to prevent the closed or spring-end of the rod from exerting a pull upon the free ends of the same to draw said ends toward each other. I provide, further, a loose wedge 9 adapted to be inserted in the closed end of the rod 6 between that end and the shank 5 to prevent tilting of said rod.

The cleaning member comprises a top plate 10 formed with lateral lips 11, 11 to carry the bottom plate 12 which plate is slidable with relation to the plate 10 and each plate is formed with alined apertures 13 through which the rake teeth may project, the plate 12 being also formed with tiny perforations 14 adapted to receive a pin 15 carried by the plate 10 whereby said plates are locked in adjustable position with relation to each other.

The fact that the plates are adjustable permits the application of the device to rakes of various sizes, it being necessary for each tooth of the rake to engage one of the apertured portions of each or both of the plates 10, 12. To adjust the attachment to a rake having a greater number of teeth than that shown in Fig. 2 the screws 8, 8 are loosened to more readily permit spreading of the ends of the rod 6, the plates are then extended to fit the rake and the screws 8, 8 again adjusted.

In cleaning a rake with the attachment it is but necessary to hold the rake above the ground and let it drop part way to the ground and stop it suddenly; the sudden stop being sufficient to cause the plates to descend over the rake teeth and remove therefrom any leaves, grass or other matter adhering thereto.

What is claimed is:—

An attachment for rakes comprising a bracket slidable upon the rake handle, an apertured depending shank formed integral with said bracket, a Y-shaped resilient rod having its closed end passed through the apertured portions of said shank, adjustable telescoping plates formed with apertures to receive the rake teeth, rearward extending ears formed upon said plates for engagement with the free ends of said Y-shaped rod and means carried by said depending shank for engagement with the closed end of said Y-shaped rod to counteract the tendency of the closed end of said rod to contract its free ends.

In testimony that I claim the foregoing as my own I have hereto affixed my signature.

WILLIAM STOFFEL.